March 11, 1930.  C. S. HOPE  1,750,317
FLUSH VALVE
Filed Nov. 5, 1923
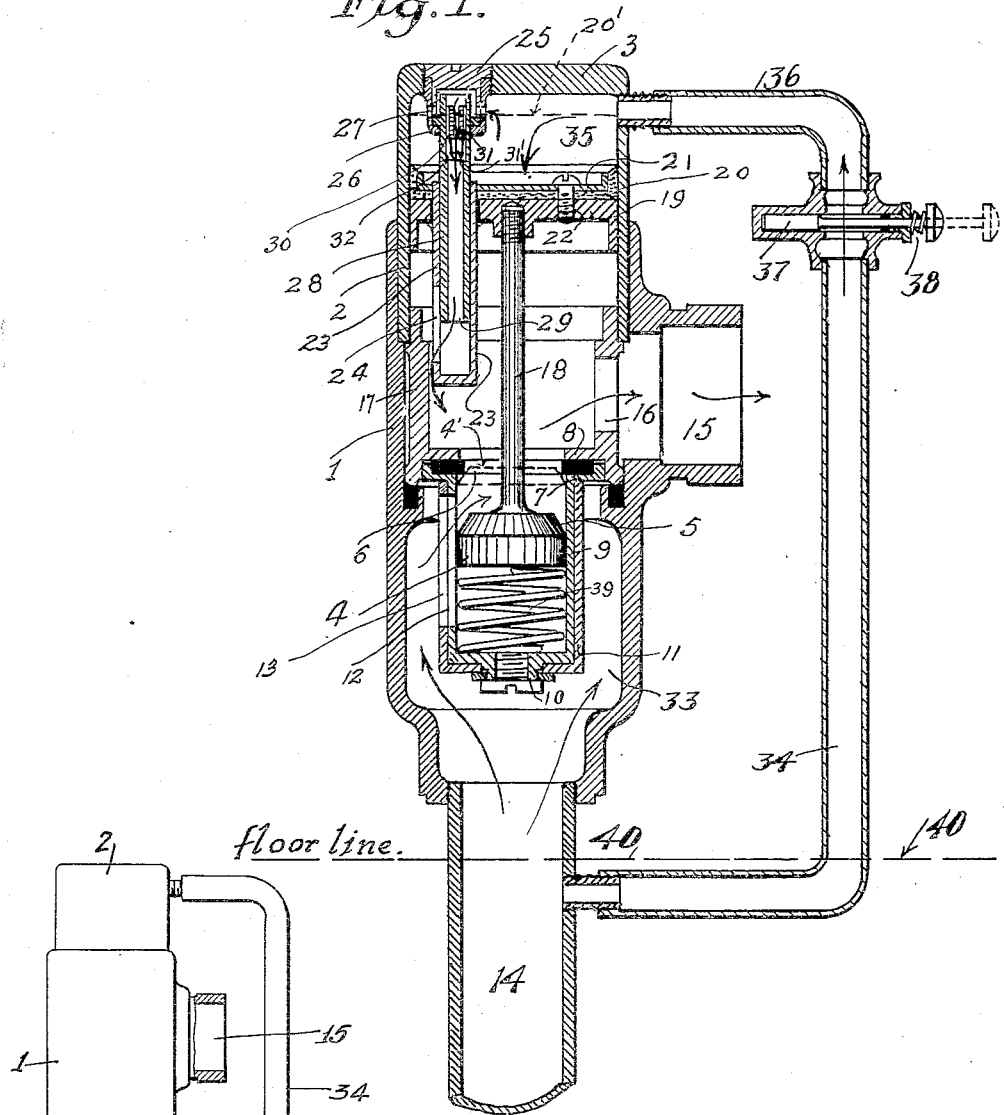
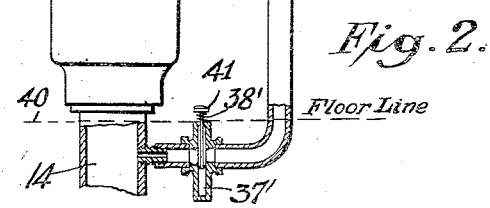
INVENTOR.
Charles S. Hope,
Harry W. Bowen,
BY
ATTORNEY.

Patented Mar. 11, 1930

1,750,317

UNITED STATES PATENT OFFICE

CHARLES S. HOPE, OF SPRINGFIELD, MASSACHUSETTS, ASSIGNOR, BY MESNE ASSIGNMENTS, TO KATHERINE KEATING, JOHN D. KEATING, AND BRIGHTIE E. BRUTNELL, ALL OF SPRINGFIELD, MASSACHUSETTS, AND MARY K. QUIRK, OF MIDDLETOWN, CONNECTICUT

FLUSH VALVE

Application filed November 5, 1923. Serial No. 672,788.

This invention relates to improvements in flush valves for the purpose of permitting a definite quantity of water to flow during a definite time.

An object of the invention is to provide means for quickly and positively starting the operation of the valve by utilizing the water pressure from the main or any suitable source of supply and, after the valve is started or set into operation to quickly and positively shut off or close the flow of the water through the starting device.

A further object is to provide a flush valve that will prevent any leakage of the controlling means. Heretofore it has been a common practice in this type of flush valve to locate, or place the valve starting mechanism, so that it projects through the casing and forms a part of the valve mechanism. This has been found to be objectionable on account of the serious leakages which sometimes occur, and, inconvenience in operating the valve. The present invention is therefore designed to entirely eliminate the objection due to leakage, and also, to provide a starting mechanism for the valve which may be placed in any convenient location, not necessarily adjacent the flush valve.

Broadly, my improvement comprises a by-pass connection which extends between the inlet or pressure side of the valve and the upper end of the valve enclosing casing and a suitable shut off or valve in the connection which is normally closed but may be operated or readily opened when the flush valve is to be started.

Fig. 1 of the drawings is a vertical sectional view considered on a plane passing through the axis of the valve showing the by-pass connection and the internal mechanism including the needle valve control.

Fig. 2 is a diagrammatic elevational view showing a modification.

Referring to the drawings in detail:

1 designates the main or outer enclosing part of the valve casing and 2 the upper part of the same having the top cap part 3. 4 designates the main valve with the inclined upper edge surface 5 which contacts with the valve seat 6 that is clamped between the flanges or ledges 7 and 8. Integral with the flange or ledge 7 is a depending barrel shaped member 9, and, attached to the part 9, by means of the screw and washer 10 is the rotatable sleeve 11, whereby the vertically arranged openings 12 and 13 in the member 9 and sleeve 11 may be adjusted relative to each other to regulate or vary the flow of the water from the main source of supply 14 to the outlet or discharge opening 15, and through the opening 16 in the part 17 which is integral with the flange 8. 18 designates a stem which is connected to the valve 4, the upper end of which is threaded for attaching a piston head 19 to the stem, 20 is a packing for this head and 21 is a plate for clamping and securing the packing to the piston head by means of the screw 22. Attached to the head 19 by brazing or soldering is a depending tubular member 23 with a vertical slit or opening 24 in the side. This member therefore moves with the piston head when the valve 4 is operated. Located in the head 3 of the casing part 2 is a plug 25 which closes the upper end of the depending member 26 which is formed with the openings 27. Located in the member 26 is the depending tubular member 28 which is open at its lower end as indicated by the reference numeral 29. In the upper end of the tubular member 28 is fitted, by means of internally located threads, a valve 30 which is formed with the external grooves 31, which valve may be adjusted to vary the distance between its lower end 31' and the seat 32 shown on the inside of the tubular member 28 for the purpose of varying the time of closing the main valve 4 as will be explained in connection with the operation of the valve.

Connected to the pipe 14 which is in communication with the pressure side or end of the system is a pipe 34 which is connected to the pipe 14 that is connected to the space 35 above the piston 19 by means of the pipe section 36. Between the pipe sections 34 and 36 is a shut off valve 37 of any suitable construction which is normally closed by means of the expansion force of the coiled spring 38.

A coiled spring 39, may, if desired be placed below the valve 4 to normally retain this main valve against the seat 6.

It is to be understood that the by-pass piping sections 34 and 36 and valve 37 may be located and arranged in any desired location for convenient operation of the flushing valve.

In Fig. 2 of the drawings, I have shown a modified form of my invention wherein the valve 37' is placed in the passage 34 at a point below the floor-line. The operating member 41 of the valve extends above the floor-line where it is disposed so as to be conveniently operated by the foot. A coil spring 38' is provided to normally hold the valve in closed position. It will be found particularly advantageous to operate the valve by means of water pressure, as the connection between the pipe 14 and the water supply may be made below the floor-line, and the valve operating member disposed above the floor-line where it may be in a convenient position to be operated by the foot.

The operation may be described as follows:

The main valve 4 is understood to be normally closed against the seat 6 as indicated by the dotted line position 4' and the valve 37 is also closed. The piston 20 is in the dotted position 20'. The combined action of the pressure of the main water supply on the bottom of the valve 4 and the spring 39, if employed, will retain the valve 4 in a normally closed position against the seat 6. When the operator moves the starting valve 37 in to an open position as shown in full line or into a partially open position, the water from the entrance or pressure side in the pipe 14 will instantly flow through the by-pass connection 34 and 36 in to the space or chamber 35 above the piston head 19 causing the piston to move downward into the full line position, and, through the connection of the piston rod 18 the main valve 4 will be moved away from its seat. The operator, as soon as the main valve is opened releases the pressure on the valve 37 permitting this valve to again automatically close the pipe 34. The water from the main supply side 14 now flows through the registering openings 12 and 13, through the opening in the valve seat 6 to the outlet 15 for flushing purposes. The main valve 4 is now moving slowly upwards towards its seat 6 thus gradually cutting off the flow to the outlet 15. The rate of upward travel of the valve 4 is controlled by the adjustment of the small needle shaped valve 30 which regulates the flow of water from the space or chamber 35 through the passage ways or openings 27 and grooves 31 as the piston 19 travels upward. During the time the piston 19 is traveling upward the port, or opening 24 in the depending tubular member 23 is gradually being closed by the upward movement of the exteriorly located tubular member 23 over the member 28, which normally opens the opening 24 when the valve 4 and piston 19 are driven downward as water is admitted to the space 35 through the by-pass pipe.

An important feature of my present invention is that by employing a by-pass and shut off valve therein, as shown, to initially start the valve 4 into action there are no operating devices located outside of the main casing to leak and, as sometimes occurs which often renders the installation of the valve casing impossible on account of lack of proper operating space. The by-pass connections may, of course, be located and installed in practically any kind of a contracted space as readily understood since very small sized pipe may be used to conduct the water to the space 35.

It should be observed that the area of the piston 19 is greater than the area of the valve 4 whereby when water is admitted into the space 35 from the pressure side the valve 4 will be opened.

It should be observed that when the main valve is closed and the piston 19 is in its upward position, practically all of the water above the piston 19 will drain off through the opening 16 and thus prevent freezing.

It should be particularly observed that the length of the opening 24 in the tubular member 23, which is attached to and moves with the piston 19, is longer or greater in length than the travel of the valve 4 and piston 19. This travel is indicated by the dotted line 20'. As the piston 19 is driven upward by the main water pressure below the piston the water above the piston 19 is forced out through the openings 27, through the grooves in the needle valve 30, past the valve seat 32 down the tube 28 through the openings 29 and 24 into the space above the valve 4 and out through the opening 16. Practically all of the water therefore above the piston 19 will be drained off by the time the valve 4 reaches its closed position, and, even if the valve 37 is in a closed or shut off position.

What I claim is:

1. A flushing valve structure comprising an upright casing having inlet and outlet openings and a piston chamber at the upper end of said casing, a valve controlling the passage of water between said openings, a piston in said chamber and connected to said valve, means disposed externally of the casing to admit water from a source of supply on the pressure side of said valve to said piston chamber on the side of the piston opposite that of the outlet opening, said means being connected to the chamber at one side thereof, and means to permit the passage of the water so admitted through the piston to the outlet opening.

2. A flushing valve structure comprising an upright casing having inlet and outlet openings and a piston chamber above the outlet opening, a valve controlling the passage of water between said openings, a piston in said chamber and connected to said valve, means disposed externally of the casing to admit water from a source of supply on the pressure side of said valve to said piston chamber on the side of the piston opposite that of the outlet opening, said means being connected to the chamber at one side thereof, and means to permit the gradual escape of the water so admitted downwardly through the piston to the outlet opening.

CHARLES S. HOPE.